United States Patent [19]

Hitomi

[11] Patent Number: 5,456,418
[45] Date of Patent: Oct. 10, 1995

[54] SPINNING REEL

[75] Inventor: Yasuhiro Hitomi, Hashimoto, Japan

[73] Assignee: Shimano Inc., Osaka, Japan

[21] Appl. No.: 88,186

[22] Filed: Jul. 6, 1993

[30] Foreign Application Priority Data

Jul. 3, 1992 [JP] Japan ................. 4-046256 U

[51] Int. Cl.⁶ .................................. A01K 89/01
[52] U.S. Cl. ........................... 242/322; 242/245
[58] Field of Search .................. 242/241, 242, 242/245, 246, 322

[56] References Cited

U.S. PATENT DOCUMENTS

| | | | |
|---|---|---|---|
| 2,766,956 | 10/1956 | Sarah | 242/242 X |
| 4,466,580 | 8/1984 | Toda | 242/245 |
| 4,535,953 | 8/1985 | Omori | 242/241 X |
| 4,601,437 | 7/1986 | Yoshikawa | 242/245 |
| 4,702,431 | 10/1987 | Kaneko | 242/245 X |
| 5,078,334 | 1/1992 | Zanon | 242/322 |
| 5,121,888 | 6/1992 | Bernard et al. | |

FOREIGN PATENT DOCUMENTS

| | | |
|---|---|---|
| 50-23588 | 7/1975 | Japan . |
| 51-10154 | 3/1976 | Japan . |
| 2260251 | 4/1993 | United Kingdom . |

*Primary Examiner*—Daniel P. Stodola
*Assistant Examiner*—Michael R. Mansen
*Attorney, Agent, or Firm*—Knobbe, Martens, Olson & Bear

[57] ABSTRACT

A locking mechanism for retaining a spool of a spinning reel in place on a spool shaft projecting from a reel body, the spool having a bore for receiving the spool shaft. The locking mechanism includes a first locking mechanism for checking relative axial movement between the spool and the spool shaft, and a second locking mechanism for checking rotation of the spool relative to the spool shaft. The second locking mechanism includes an engageable pin extending radially of the spool shaft, engaging members formed in the spool for interacting with the pin to check rotation in a line unwinding direction of the spool relative to the spool shaft, and biasing members for pressing the pin upon the engaging members of the spool.

20 Claims, 7 Drawing Sheets

SPINNING REEL

BACKGROUND OF THE INVENTION

1. Field of the Invention

The present invention relates to a spinning reel of the type having a spool disposed forwardly of a reel body, a spool shaft extending longitudinally of the reel body and through the spool to support the spool, a retainer mechanism disposed between the spool and a forward end region of the spool shaft to check movement of the spool along the spool shaft, and a rotation stopper mechanism disposed between the spool and an intermediate position of the spool shaft to check rotation of the spool relative to the spool shaft. Particularly, the invention relates to a spool supporting structure.

2. Description of the Related Art

A known spinning reel having the above construction is disclosed in Japanese Utility Model Publication Kokai No. 2-78069, for example. In this prior construction, the spool includes a spring (retainer mechanism) for engaging an annular groove formed in a forward end region of the spool shaft, and elongate recesses (engaging members) fitted with a pin (engageable member) provided in an intermediate position of the spool shaft. The spring and pin together impart a compressive force to determine a fore and aft position of the spool, while the engagement between the pin and recesses checks rotation of the spool.

According to the known construction, the spool is attachable and detachable with the spring movable into and out of engagement with the annular groove of the spool shaft. This construction has an advantage that, when attaching the spool, the elongate recesses in the spool may be fitted quickly with the pin on the spool shaft.

With the above spool support structure, a high degree of precision may be secured relatively easily between an outside diameter of the spool shaft and an inside diameter of a bore formed in the spool to receive the spool shaft. However, it is difficult to secure a high degree of precision for the position, particularly longitudinally of the spool shaft, in which the pin is erected on the spool shaft. In the known reel, the elongate recesses have a width larger than a pin diameter to accommodate a possible error and to enable a quick engagement therebetween.

Consequently, the known spool allows the spool to be attached and detached with ease, but gaps between the pin and recesses tend to produce play, in use, between the spool and spool shaft in a rotating direction of the spool. There is room for improvement in this respect.

In an actual fishing situation, such play could result in a delay in timing for securely hooking fish, thereby allowing the fish to escape. At a reeling time, the spool may vibrate circumferentially by the amount of play, which impairs the angler's feeling of control operation.

SUMMARY OF THE INVENTION

An object of the present invention is to provide an improved spinning reel which, without attempting to improve precision for the position in which an engageable piece is formed on a spool shaft, allows an engaging mechanism formed in a spool to engage, without play, the engageable piece formed on the spool shaft, thereby to produce no delay in timing for securely hooking fish in an actual fishing situation.

The above object is fulfilled, according to the present invention, by a spinning reel having a locking mechanism for retaining a spool in place on a spool shaft projecting from a reel body, the locking mechanism comprising first lock means for checking relative axial movement between the spool and the spool shaft, and second lock means for checking rotation of the spool relative to the spool shaft, the second lock means including an engageable member mounted on the spool shaft to extend radially thereof, engaging members formed in a region of a spool shaft receiving bore of the spool for interacting with the engageable member to check rotation in a line unwinding direction of the spool relative to the spool shaft, and first bias means for assisting the engageable member in interacting with the engaging members.

In a preferred embodiment of the invention, the spool is supported on the spool shaft extending therethrough, with the first bias means of the spool pressed by springs against the engageable member of the spool shaft. This constantly prevents chattering of the spool in directions of its rotation relative to the spool shaft. In addition, rotation in the line unwinding direction of the spool is checked not by the bias means but by the engaging members fixed to the spool. Consequently, rotation of the spool is reliably prevented even when a tension is suddenly applied to the fishing line.

According to the present invention, the first bias means is displaceable relative to the engageable member. Even where an error has occurred with a position of the engageable member longitudinally of the spool shaft, displacement of the bias means occurring upon attachment of the spool allows engagement of the engageable member.

Thus, the present invention provides an improved spinning reel which, without attempting to improve precision for the position in which an engageable piece is formed on a spool shaft, allows the engaging members to engage the engageable piece with no play therebetween, thereby to produce no delay in timing for securely hooking fish.

The spinning reel may further include second bias means displaceable axially of the spool shaft to bias the engageable member axially of the spool shaft also. This provides the advantage of eliminating chattering of the spool axially of the spool shaft even if an error has occurred with the position of the engageable member on the spool shaft.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
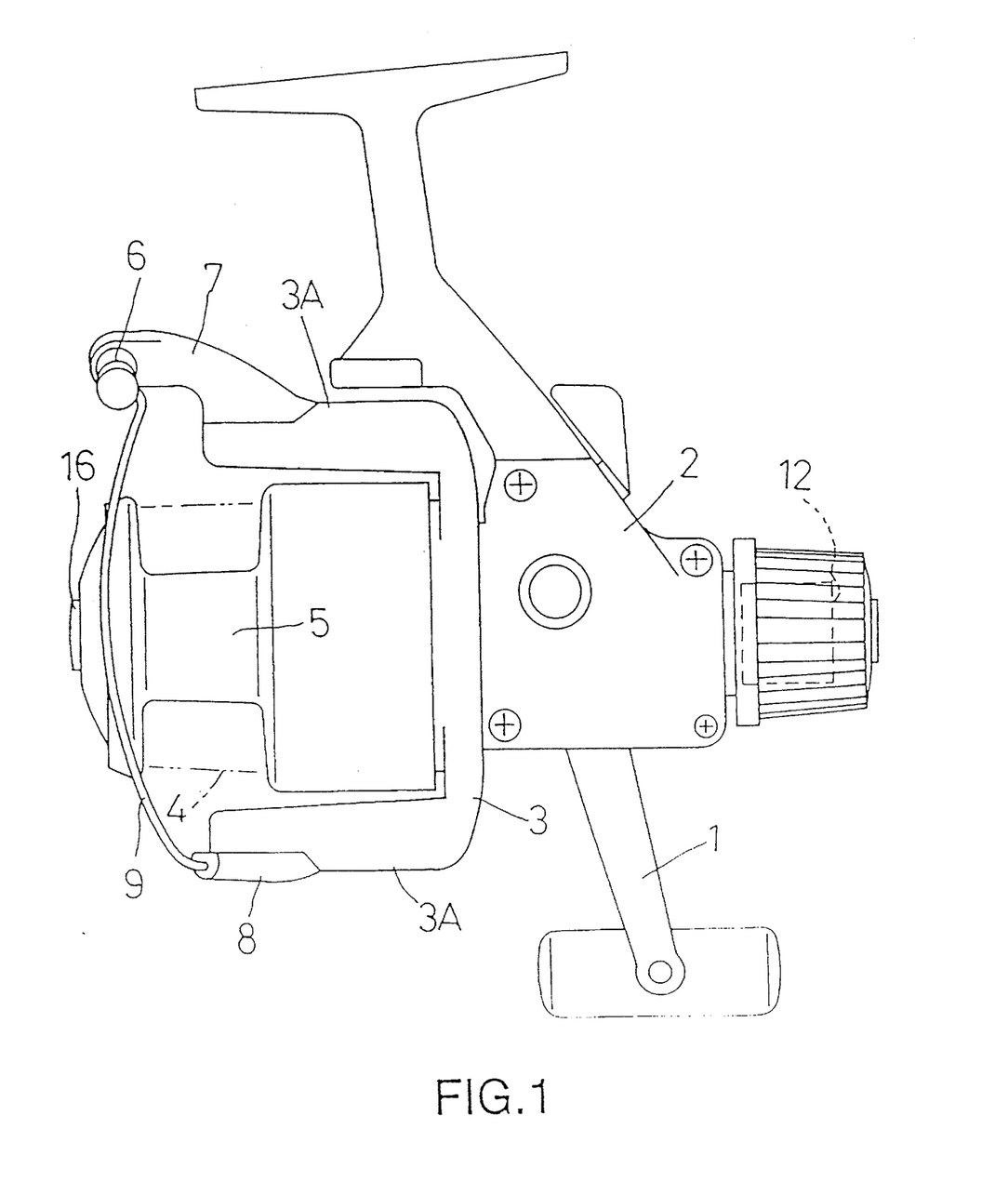
FIG. 1 is a side view of a spinning reel in a first embodiment of the present invention.

FIG. 1 shows a spinning reel in a first embodiment of the invention. This spinning reel has a handle 1 connected to a reel body 2 including, in forward positions thereof, a rotor 3 rotatable by drive transmitted from the handle 1, and a spool 5 for winding a fishing line 4. The rotor 3 includes a pair of arms 3A formed integral therewith. One of the arms 3A includes an oscillatable arm cam 7 having a line roller 6. The other arm 3A includes an oscillatable support arm 8. A bail 9 extends between the arm cam 7 and support arm 8.

Figure 2:
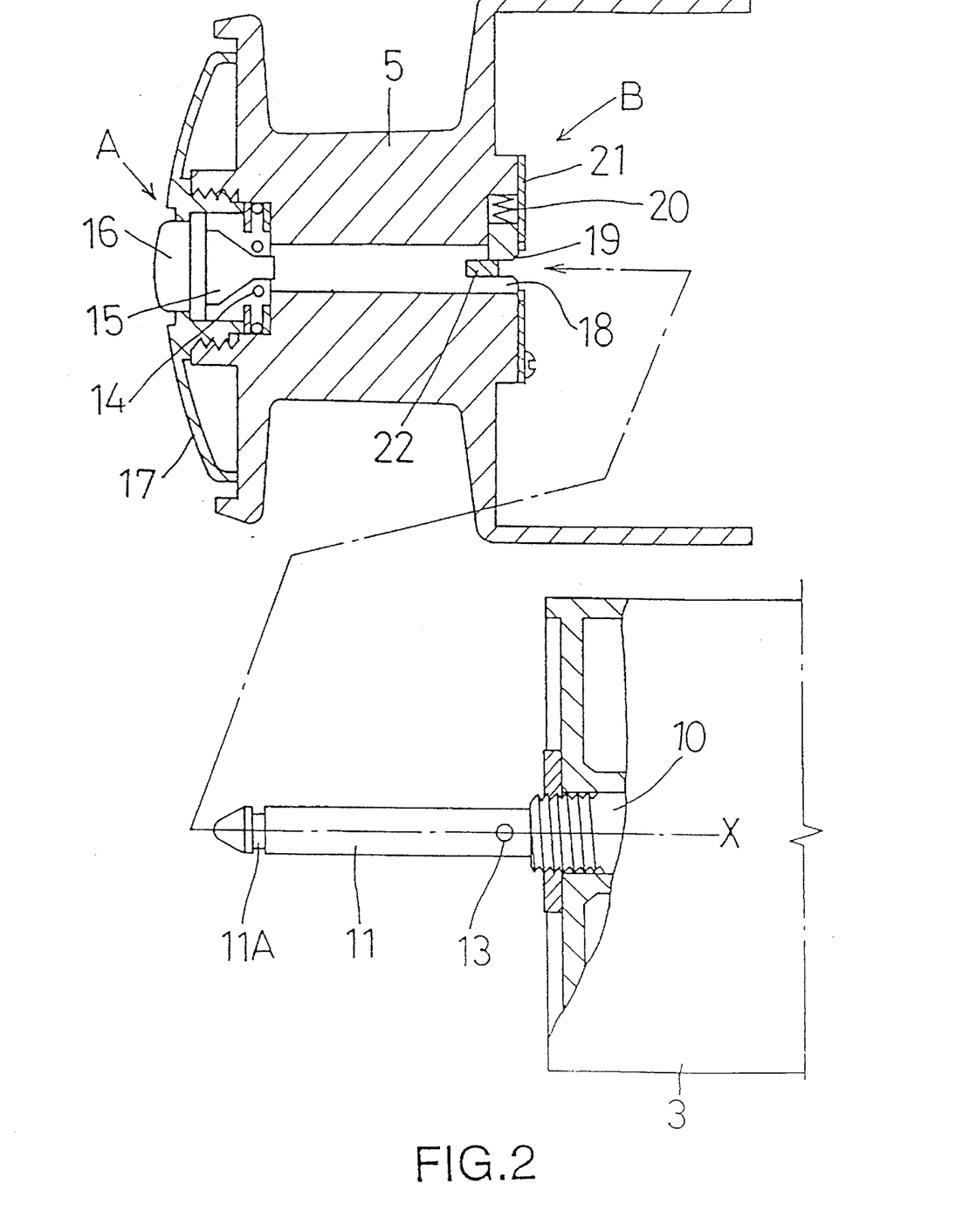
FIG. 2 is a sectional side view of a spool and a forward portion of a rotor in the first embodiment.
Figure 3:
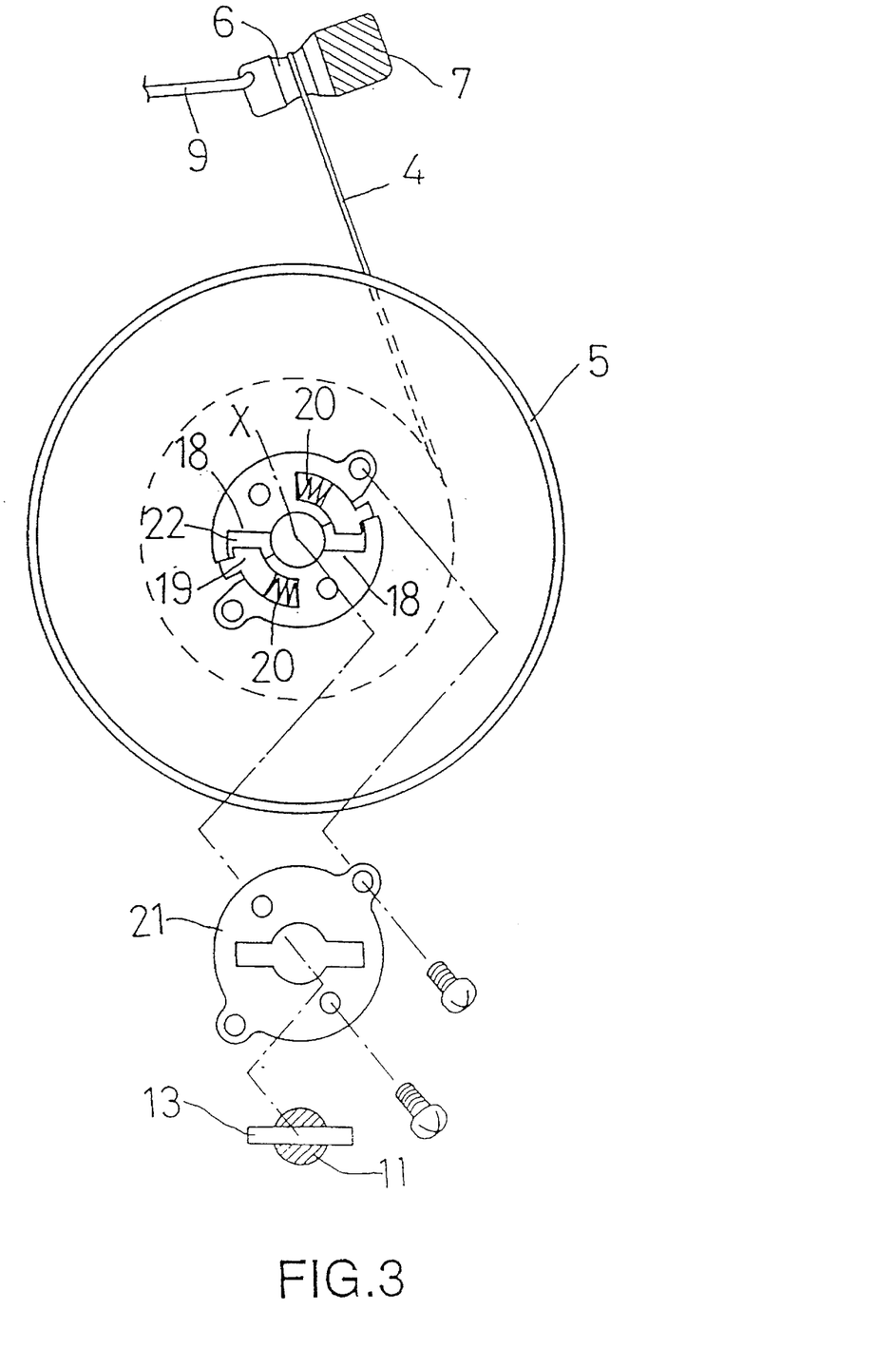
FIG. 3 is a rear view of the spool in the first embodiment.
Figure 4:
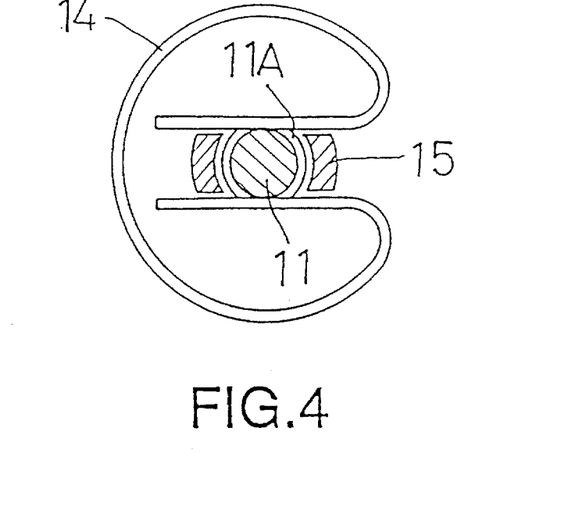
FIG. 4 is a front view of a spring of a first locking mechanism engaging a spool shaft in the first embodiment.

As shown in FIGS. 2 through 4, this reel further includes a sleeve shaft 10 for transmitting the drive from the handle 1 to the rotor 3. A spool shaft 11 extends through the sleeve shaft 10, with a forward portion of the spool shaft 11 extending into the spool 5 to support the latter. A drag mechanism 12 is disposed in a rear position of the reel body 2 to apply a braking force to a rear end of the spool shaft 11. A first locking mechanism A is disposed at a forward end of the spool 5 to engage an annular groove 11A formed in a forward end region of the spool shaft 11, thereby preventing the spool 5 from falling off the spool shaft 11. A second locking mechanism B is provided to engage a pin 13 (one example of engageable members) formed in an intermediate position of the spool shaft 11, thereby preventing the spool 5 from rotating about an axis of the spool shaft 11. Thus, the first and second locking mechanisms hold the spool 5 in place.

The first locking mechanism A includes a spring 14 fitted in opposite portions of the annular groove 11A formed in the spool shaft 11, a button 16 having a cam 15 for disengaging the spring 14 from the groove 11A, and a case 17 screwed to a front face of the spool 5 to enclose these elements.

The second locking mechanism B includes engaging members 18 formed integral with the spool 5 to contact the pin 13 to prevent rotation of the spool 5 in a direction to unwind the fishing line 4, biasing members 19 for pressing the pin 13 against the engaging members 18 in a circumferential direction about an axis X which is the axis of the spool shaft 11, springs 20 (one example of biasing means) for pressing the biasing members 19 toward the pin 13, a plate 21 for retaining these elements in place, and an elastic member 22 such as rubber for pressing the pin 13 rearwardly along the axis X. A space between the engaging member 18 and biasing member 19 is slightly smaller than a diameter of the pin 13 when out of engagement. A distance between a position of the spring 14 and a rear surface of the elastic member 22 is slightly smaller than a distance between the annular groove 11A and pin 13 of the spool shaft 11.

The spool 5 may be detached by pushing the button 16 disposed on the front face of the spool 5. The spool 5 may be attached to the spool shaft 11 by pushing the spool 5 rearwardly on the spool shaft 11. In this way, the spool 5 may be mounted in place, with the pin 13 held between the engaging members 18 and biasing members 19 to eliminate chattering in directions of rotation, and with the elastic member 22 elastically compressed to eliminate chattering axially of the spool shaft 11.

Other embodiments will be described hereinafter.

Figure 5:
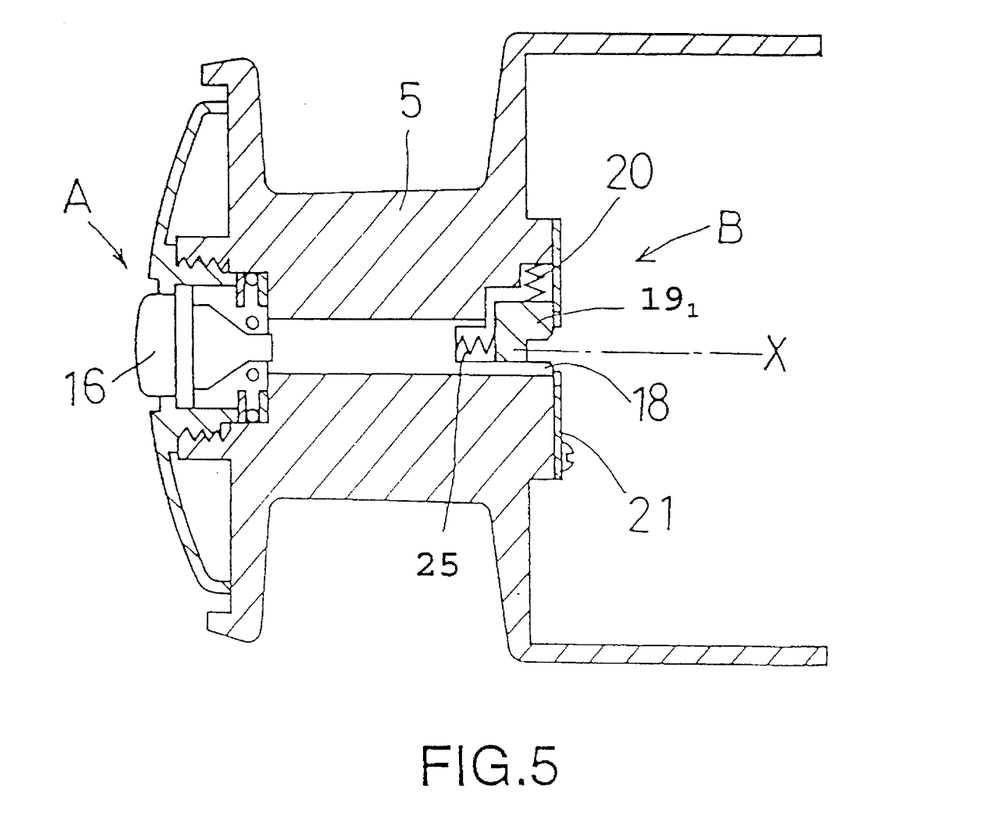
FIG. 5 is a sectional side view of a spool in a second embodiment of the invention.

As shown in FIG. 5, a spinning reel in a second embodiment includes a second locking mechanism B having biasing members $19_1$ displaceable circumferentially about the axis X as in the first embodiment. The biasing members $19_1$ in this embodiment are displaceable also along the axis X. Springs 20 and 25 are provided to bias the biasing members $19_1$ circumferentially and axially. Thus, the spool 5 is supported without chattering both in the direction of rotation and along the axis X.

Figure 6:
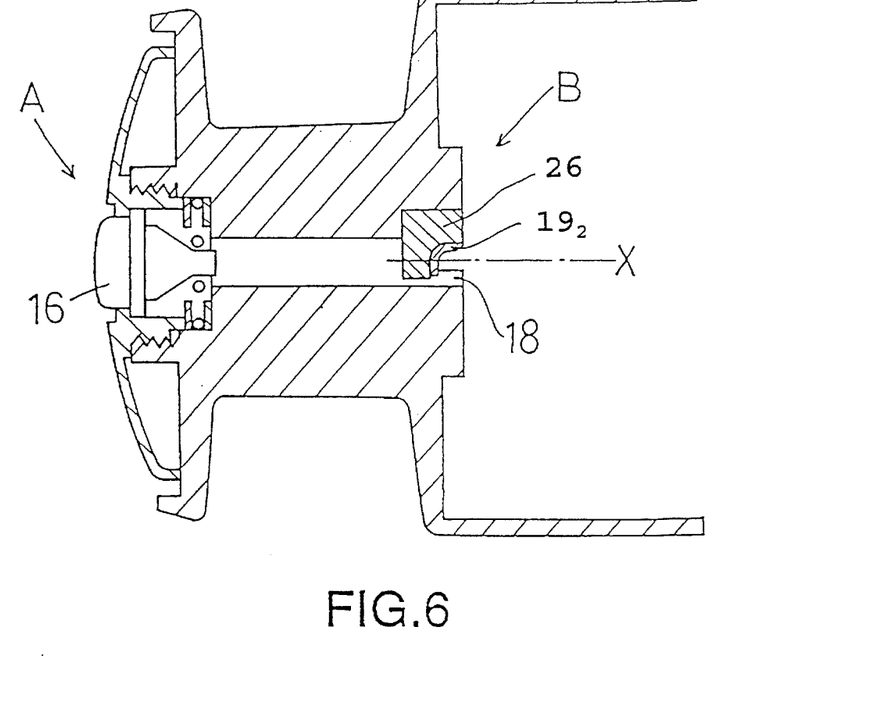
FIG. 6 is a sectional side view of a spool in a third embodiment of the invention.
Figure 7:
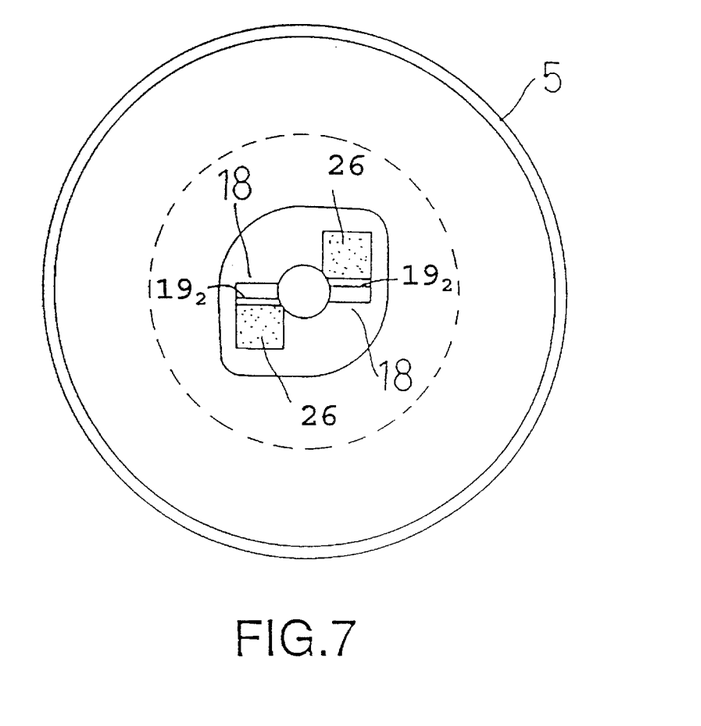
FIG. 7 is a rear view of the spool in the third embodiment.

In a third embodiment, as shown in FIGS. 6 and 7, a second locking mechanism B includes biasing members $19_2$ formed of a relatively hard material to contact the pin 13 circumferentially and axially. A rubber support 26 is formed integral with each biasing member $19_2$ to bias the latter circumferentially and axially.

Figure 8:
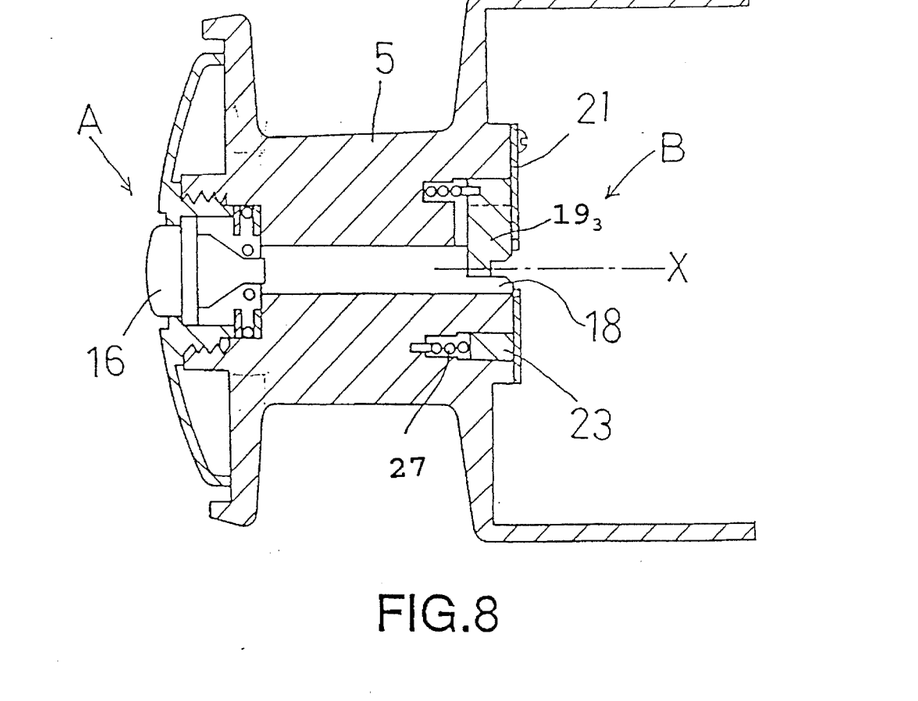
FIG. 8 is a sectional side view of a spool in a fourth embodiment of the invention.
Figure 9:
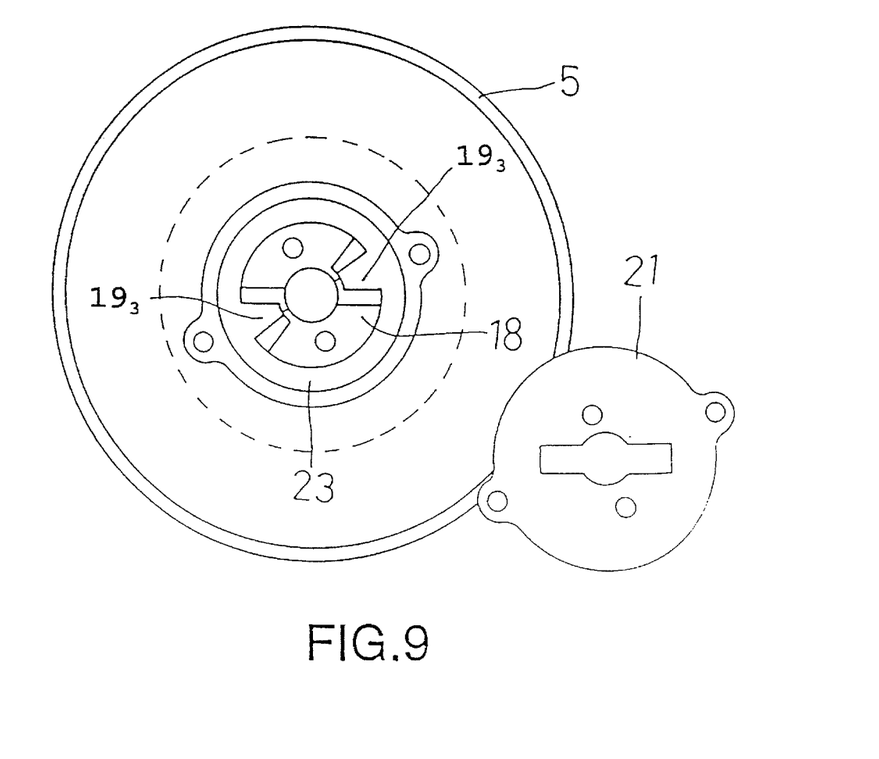
FIG. 9 is a rear view of the spool in the fourth embodiment.

In a fourth embodiment, as shown in FIGS. 8 and 9, a second locking mechanism B includes a pair of biasing members $19_3$ formed integral with a ring 23 to contact the pin 13 circumferentially and axially. The ring 23 is mounted in the spool 5 to be rotatable about the axis X. A coil spring 27 biases the biasing members $19_3$ both circumferentially and axially. That is, the coil spring 20 has functions of both a helical spring and a compression spring. The ring 23 is retained in place by a plate 21.

Figure 10:
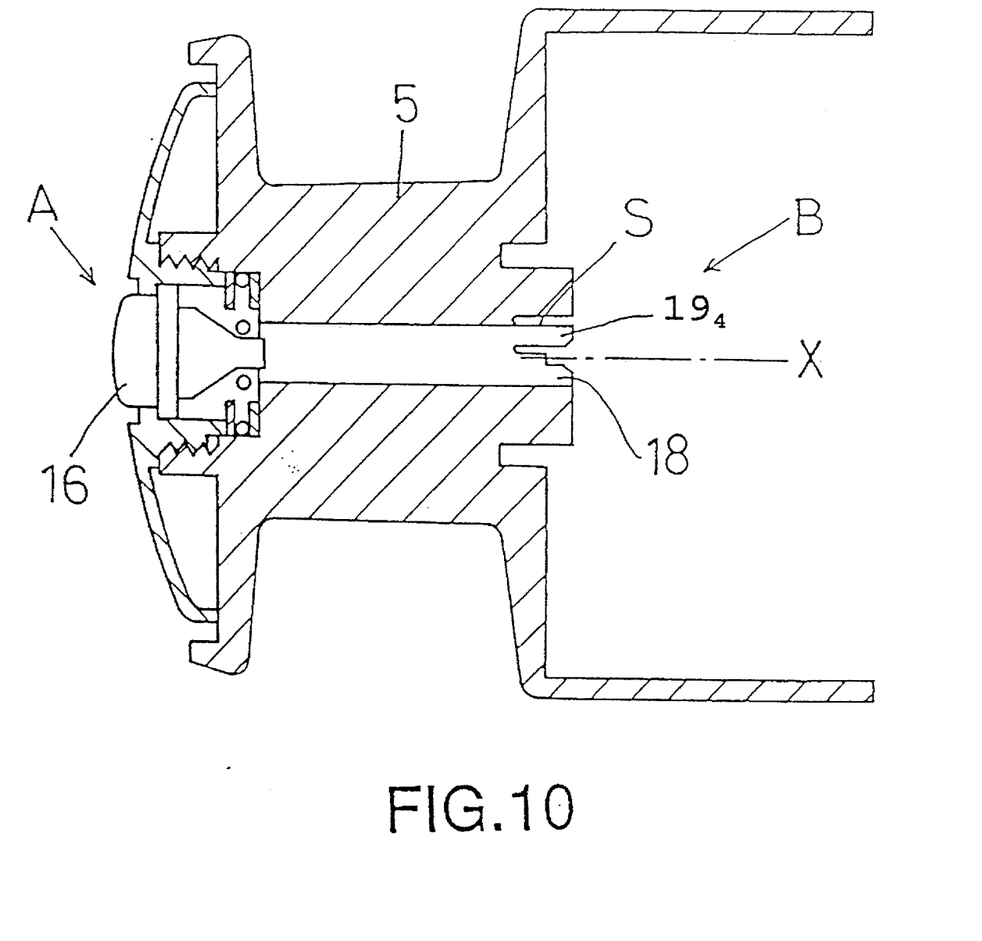
FIG. 10 is a sectional side view of a spool in a fifth embodiment of the invention.

In a fifth embodiment, as shown in FIG. 10, a second locking mechanism B includes biasing members 19 formed integral with and of the same material as the spool 5, and slits S formed adjacent the biasing members $19_4$. The biasing members $19_4$ are elastically deformable based on their own elasticity, so that the biasing members $19_4$ act also as the spring 20 of FIG. 2 or 5. In this embodiment, the biasing members $19_4$ may also perform the function to bias the pin 13 axially, which is based on the deformability of the biasing members $19_4$ gradually decreasing from free ends toward proximal ends thereof.

According to the present invention, the biasing members may be formed of plate springs to act as the biasing means as well. The biasing members may be arranged displaceable in directions tangential to the circumferential direction about the spool shaft. The invention is applicable also to spinning reels other than the described rear drag type spinning reel.

What is claimed is:

1. A locking mechanism for retaining a spool of a spinning reel in place, said spinning reel including a spool shaft projecting from a reel body, said spool having a bore for receiving said spool shaft, said locking mechanism comprising:

first lock means disposed between said spool and said spool shaft for checking relative axial movement between said spool and said spool shaft; and second lock means for checking rotation of said spool relative to said spool shaft, said second lock means being disposed apart from said first lock means in an axial direction of said spool shaft, and said second lock means including:

an engageable member mounted on said spool shaft to extend radially thereof;

engaging members having contact surfaces with fixed faces formed integral with said spool for interacting with said engageable member to check rotation of said spool relative to said spool shaft in a line unwinding direction, said fixed faces extending radially of said spool from a region of said bore of said spool; and first bias means for assisting said engageable member in interacting with said engaging members.

2. A locking mechanism as defined in claim 1, wherein:

said engageable member being a pin provided on said spool shaft to said spool shaft to contact with said fixed faces;

said spool including guide grooves, said guide grooves extending circumferentially around an axis of said spool shaft from neighborhoods of said engaging members; and said engaging members being able to receive said pin, and said first bias means including:

bias members displaceable in said guide grooves toward said engaging members such that said bias members press said engageable members against said fixed faces in the circumferential direction about said axis of said spool shaft, resilient members provided between said guide grooves and said bias members, said resilient members biasing said bias members toward said engaging members along said guide grooves to restrict a rotation of said pin about an axis of said spool by pushing said pin received between said engaging members and said bias members onto said contact faces of said engaging members.

3. A locking mechanism as defined in claim 2, wherein said locking mechanism including a cover member provided on said spool to retain said first bias means.

4. A locking mechanism as defined in claim 1, wherein said first bias means includes biasing members, and elastic members for biasing said biasing members toward said contact surfaces.

5. A locking mechanism as defined in claim 4, wherein said elastic members are support elements formed of rubber.

6. A locking mechanism as defined in claim 1, further comprising second bias means for biasing said engageable member axially of said spool shaft.

7. A locking mechanism as defined in claim 6, wherein said second bias means is a rubber element mounted in said spool.

8. A locking mechanism as defined in claim 6, wherein said second bias means includes biasing members, and elastic members for supporting said biasing members.

9. A locking mechanism as defined in claim 8, wherein said elastic members are compression springs.

10. A locking mechanism as defined in claim 8, wherein said elastic members are support elements formed of rubber.

11. A locking mechanism as defined in claim 6, wherein said first bias means and said second bias means are formed as a biasing unit, said biasing unit including biasing members having surfaces opposed to each other radially of said spool shaft, and surfaces extending transversely of an axis of said spool shaft, and elastic members for biasing said biasing members radially and axially of said spool shaft.

12. A locking mechanism as defined in claim 11, wherein said elastic members comprise compression springs for biasing said biasing members radially of said spool shaft, and compression springs for biasing said biasing members axially of said spool shaft.

13. A locking mechanism as defined in claim 11, wherein said elastic members are integrated into a spring operable both as a helical spring to bias said biasing members radially of said spool shaft and as a compression spring to bias said biasing members axially of said spool shaft.

14. A locking mechanism as defined in claim 1, wherein said first bias means includes elastically deformable tongue-like members opposed to and extending toward said engaging members.

15. A locking mechanism as defined in claim 14, wherein said tongue-like members are formed integral with said spool.

16. A locking mechanism as defined in claim 14, wherein said tongue-like members act also as second bias means to bias said engageable member axially of said spool shaft.

17. A locking mechanism as defined in claim 1, wherein at least one of said engaging members and said bias means has a slope to facilitate reception of said engageable member.

18. A locking mechanism for retaining a spool of a spinning reel in place, said spinning reel including a spool shaft projecting from a reel body, said spool having a bore for receiving said spool shaft, said locking mechanism comprising:

first lock means disposed between said spool and said spool shaft for checking relative axial movement between said spool and said spool shaft; and second lock means for checking rotation of said spool relative to said spool shaft, said second lock means including:

an engageable member mounted on said spool shaft to extend radially thereof;

engaging members formed in a region of said bore of said spool for interacting with said engageable member to check rotation in a line unwinding direction of said spool relative to said spool shaft, said engaging members defining contact surfaces for contacting said engageable member; and first bias means including biasing members and elastic members for pressing said engageable member upon said contact surfaces, said elastic member being formed of compression springs to bias said biasing members toward said contact surfaces.

19. A locking mechanism for retaining a spool of a spinning reel in place, said spinning reel including a spool shaft projecting from a reel body, said spool having a bore for receiving said spool shaft, said locking mechanism comprising:

a first lock disposed between said spool and said spool shaft for checking relative axial movement between said spool and said spool shaft; and a second lock for checking rotation of said spool relative to said spool shaft, said second lock including:

an engageable member mounted on said spool shaft to extend radially thereof;

engaging members formed in a region of said bore of said spool, said engaging members including contact surfaces for contacting with said engageable member to check rotation of said spool relative to said spool shaft in a line unwinding direction; and a first bias for pressing said engageable member against said contact surfaces, said first bias including biasing members and compression springs for pressing said biasing members toward said contact surfaces.

20. A locking mechanism for retaining a spool of a spinning reel in place, said spinning reel including a spool shaft projecting from a reel body, said spool having a bore for receiving said spool shaft, said locking mechanism comprising:

a first lock disposed between said spool and said spool shaft for checking relative axial movement between said spool and said spool shaft; and a second lock for checking rotation of said spool relative to said spool shaft, said second lock being disposed apart from said first lock in an axial direction of said spool shaft, and said second lock including:

an engageable member mounted on said spool shaft to extend radially thereof;

engaging members having contact surfaces with fixed faces formed integral with said spool for interacting with said engageable member to check rotation of said spool relative to said spool shaft in a line unwinding direction, said fixed faces extending radially of said spool from a region of said bore of said spool; and first bias means for assisting said engageable member in interacting with said engaging members.

* * * * *